(No Model.)

E. S. CROSS.
SADDLE.

No. 500,472. Patented June 27, 1893.

WITNESSES:
Fred G. Dieterich
M. D. Blondel

INVENTOR:
Edward S. Cross.
BY Munn & Co.
ATTORNEYS

UNITED STATES PATENT OFFICE.

EDWARD S. CROSS, OF ELYRIA, OHIO.

SADDLE.

SPECIFICATION forming part of Letters Patent No. 500,472, dated June 27, 1893.

Application filed July 22, 1892. Serial No. 440,956. (No model.)

*To all whom it may concern:*

Be it known that I, EDWARD S. CROSS, of Elyria, in the county of Loraine and State of Ohio, have invented certain new and useful Improvements in Bicycle-Saddles, of which the following is a specification.

My invention has for its object to provide a simple inexpensive bicycle saddle in which the spring is formed of a forward and rearward section, arranged to overlap, and held to adjusted positions by a single clip device which is also adapted to be attached to the seat bar.

My invention consists in the peculiar combination and novel arrangement of parts all of which will be described in the specification and particularly pointed out in the claims, reference being had to the accompanying drawings in which—

Figure 1:
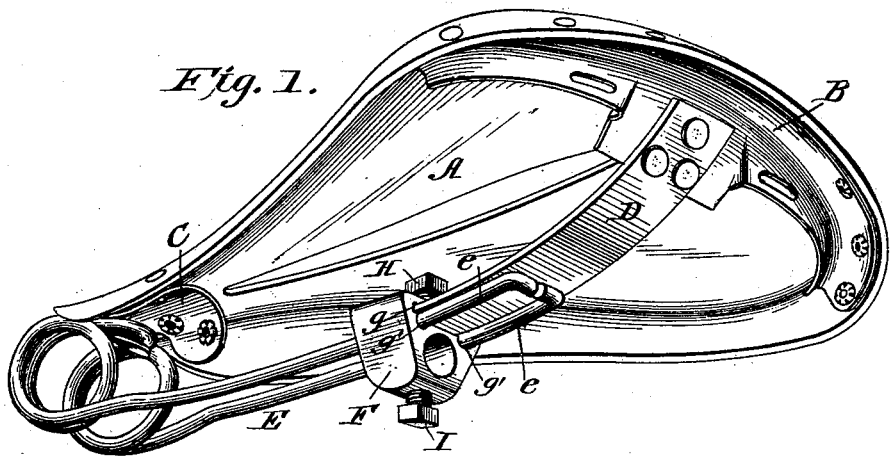
Figure 2:
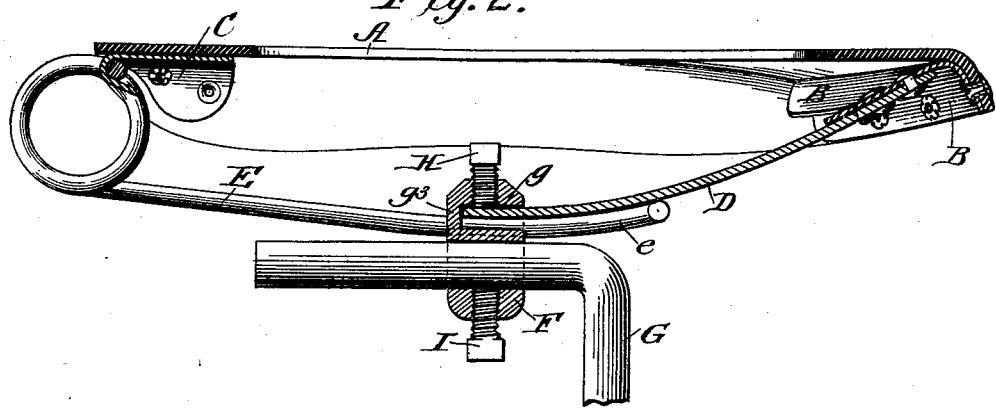
Figure 3:
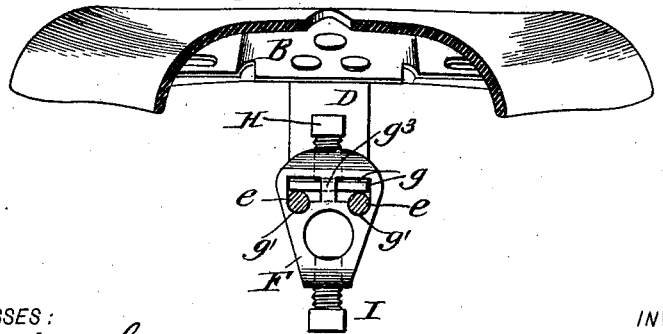

Figure 1 is an inverted perspective view of my improved saddle. Fig. 2 is a longitudinal section thereof and Fig. 3 is a transverse section on the line 3—3 Fig. 2.

Referring to the drawings A indicates the cover or seat to the rear end of which is secured the cantle B, and at the front the hook C of the usual construction. To the cantle is secured the rear end of a flat spring D which is curved downward and forward to near the middle of the cover.

E indicates the forward loop or rod spring, secured to the hook C at its front end, while its free ends $e\ e$ are extended rearward, under the forward end of the flat spring D as shown most clearly in Fig. 2. By reference to the said figure it will be noticed that a single clip F is employed for holding the springs together and for securing the saddle to the seat bar G, such clip having also a transverse recess $g$, the base of which at the edges is formed with concaved grooves $g'$ in which seat the ends $e\ e$ of the spring E. It will also be noticed that the end of the spring D seats in the said recess $g$, resting upon the ends $e\ e$ of the spring E and held from passing through the same by a stop lug $g^3$ cast with the clip, against which the front end of the spring D abuts.

H indicates the adjusting screw for holding the springs to their proper tension and I the seat bar clip screw.

By arranging the forward and backward springs as described and securing them in a single clip as shown, the forward spring will reinforce the rear spring against any unusual strain, the lug or abutment $g^3$ serving to resist any forward pull of the rear spring when taking up slack in the cover, by pulling on the forward spring.

Having thus described my invention, what I claim, and desire to secure by Letters Patent, is—

As an improvement in bicycle saddles, the combination with the cover, the cantle and the hook, of a flat spring bar secured at its rear end to the cantle, a looped spring secured to the hook, its arms projected rearward and seated against the under face of the spring bar, a clip, having a transverse aperture adapted to receive the seat supporting bar, formed with transverse openings, to receive the ends of the loop spring, and with a socket portion, having an abutment lug at its front end, arranged above the spring receiving apertures, said socket adapted to receive the front end of the spring bar, the lug engaging such end and limiting its forward movement and means for securing the clip to the springs and seat bar all substantially as and for the purpose described.

The above specification of my invention signed by me in the presence of two subscribing witnesses.

EDWARD S. CROSS.

Witnesses:
SUSIE E. ROWE,
CATHERINE CROSS.